US010217475B2

(12) United States Patent
Lee et al.

(10) Patent No.: US 10,217,475 B2
(45) Date of Patent: Feb. 26, 2019

(54) HEADSET AND METHOD FOR CONTROLLING SAME

(71) Applicant: LG ELECTRONICS INC., Seoul (KR)

(72) Inventors: Heungkyu Lee, Seoul (KR); Byounggi Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/579,766

(22) PCT Filed: Jul. 3, 2015

(86) PCT No.: PCT/KR2015/006861
§ 371 (c)(1),
(2) Date: Dec. 5, 2017

(87) PCT Pub. No.: WO2016/208797
PCT Pub. Date: Dec. 29, 2016

(65) Prior Publication Data
US 2018/0174597 A1 Jun. 21, 2018

(30) Foreign Application Priority Data
Jun. 25, 2015 (KR) ........................ 10-2015-0090666

(51) Int. Cl.
| | | |
|---|---|---|
| G10L 21/02 | (2013.01) | |
| G10L 21/0316 | (2013.01) | |
| G10L 21/0232 | (2013.01) | |
| G06F 3/0484 | (2013.01) | |
| G06F 3/0488 | (2013.01) | |
| G06F 3/16 | (2006.01) | |
| G06F 3/0481 | (2013.01) | |
| G06F 3/0482 | (2013.01) | |
| H04M 1/725 | (2006.01) | |
| H04M 1/60 | (2006.01) | |
| H04R 1/10 | (2006.01) | |
| H04R 1/40 | (2006.01) | |
| H04R 3/00 | (2006.01) | |
| H04R 29/00 | (2006.01) | |

(52) U.S. Cl.
CPC ........ G10L 21/0205 (2013.01); G06F 3/0488 (2013.01); G06F 3/04847 (2013.01); G06F 3/165 (2013.01); G10L 21/0232 (2013.01); H04M 1/72563 (2013.01); H04R 1/10 (2013.01); H04R 1/406 (2013.01); H04R 3/005 (2013.01); H04R 29/005 (2013.01); *G06F 3/0482* (2013.01); *G06F 3/04817* (2013.01); *G10L 21/02* (2013.01); *G10L 21/0316* (2013.01); *H04M 1/6008* (2013.01); *H04M 1/6066* (2013.01); *H04R 2410/01* (2013.01); *H04R 2420/07* (2013.01)

(58) Field of Classification Search
CPC .... G06F 3/04847; G06F 3/0488; G06F 3/165; G06F 3/04817; G06F 3/0482; G10L 21/0205; G10L 21/0232; G10L 21/02; G10L 21/0316; H04M 1/72563; H04M 1/6008; H04M 1/6066; H04R 1/10; H04R 1/406; H04R 3/005; H04R 29/005; H04R 2410/01; H04R 2420/07
See application file for complete search history.

(56) References Cited

U.S. PATENT DOCUMENTS

| | | | | |
|---|---|---|---|---|
| 2008/0055263 | A1* | 3/2008 | Lemay | H04M 1/72522 345/173 |
| 2008/0175399 | A1* | 7/2008 | Kim | H03G 3/32 381/57 |
| 2010/0246860 | A1* | 9/2010 | Rye | H04M 1/05 381/151 |
| 2011/0255702 | A1 | 10/2011 | Jensen | |
| 2012/0197634 | A1* | 8/2012 | Ishikawa | G10L 21/043 704/201 |
| 2012/0269356 | A1* | 10/2012 | Sheerin | H04R 29/004 381/58 |
| 2013/0034239 | A1* | 2/2013 | Shin | H04R 1/1083 381/74 |

(Continued)

FOREIGN PATENT DOCUMENTS

| | | |
|---|---|---|
| JP | 2005-277999 A | 10/2005 |
| KR | 10-2008-0069400 A | 7/2008 |
| KR | 10-1086624 B1 | 11/2011 |
| KR | 10-1381289 B1 | 4/2014 |

*Primary Examiner* — Sonia L Gay
(74) *Attorney, Agent, or Firm* — Birch, Stewart, Kolasch & Birch, LLP

(57) ABSTRACT

A headset including a wireless communication unit configured to provide wireless communication; a first microphone mounted on the headset; and a second microphone to be placed within an ear of the user wearing the headset; a controller configured to receive a phone call via the wireless communication unit from an external device, select either one of the first microphone or the second microphone to receive a voice signal of the user responding to the received phone call, in response to the selection of the first microphone, receive the voice signal of the user through the first microphone, correct a sound quality of the voice signal received through the first microphone, and transmit the corrected voice signal to the external device, and in response to the selection of the second microphone, receive the voice signal of the user from the external auditory canal of the ear of the user having the second microphone placed therein, correct a sound quality of the voice signal received through the second microphone and transmit the corrected voice signal to the external device.

19 Claims, 9 Drawing Sheets

(56) References Cited

U.S. PATENT DOCUMENTS

| | | | |
|---|---|---|---|
| 2013/0226593 A1* | 8/2013 | Magnusson | H04N 5/765 704/276 |
| 2014/0086434 A1* | 3/2014 | Bang | A61B 5/123 381/98 |
| 2015/0056969 A1* | 2/2015 | Shao | H04M 19/041 455/415 |

* cited by examiner

HEADSET AND METHOD FOR CONTROLLING SAME

CROSS-REFERENCE TO RELATED APPLICATIONS

This application is the National Stage of International Application No. PCT/KR2015/006861, filed on Jul. 3, 2015, which claims the benefit of earlier filing date and right of priority under 35 U.S.C. 119(a) to Korean Application No. 10-2015-0090666, filed on Jun. 25, 2015, all of which are hereby expressly incorporated by reference into the present application.

BACKGROUND OF THE INVENTION

1. Field of the Invention

The present disclosure relates to a headset and a control method thereof.

2. Background of the Invention

Terminals may be classified into mobile/portable terminals and stationary terminals according to their mobility. Mobile terminals may also be classified as handheld terminals or vehicle mounted terminals according to whether or not a user can directly carry the terminal. Such a terminal may be connected to a headset, and make a phone call or listen to music or the like through the headset.

SUMMARY OF THE INVENTION

An object of the present disclosure is to provide a headset capable of selecting a microphone during a phone call, correcting a call sound received through the microphone, and transmitting the corrected call sound to the counterpart terminal, thereby improving a quality of user call sound transmitted to the counterpart terminal, and a control method thereof.

A headset according to an embodiment of the present disclosure may include a microphone; a controller configured to select the microphone during a phone call and receive a voice signal provided from a user's external auditory canal through the selected microphone; a correction unit configured to correct the voice signal received through the microphone; and a communication unit configured to transmit the corrected voice signal to an external device.

The headset according to an embodiment of the present disclosure may include a first microphone configured to receive a voice signal in the vicinity of the headset; a second microphone configured to receive a voice signal provided from the user's external auditory canal; a controller configured to select either one of the first and second microphones during a phone call; a correction unit configured to correct the voice signal received through the selected either one microphone; and a communication unit configured to transmit the corrected voice signal to an external device.

According to an embodiment, the controller may select either one of the first and second microphones based on an input for selecting either one of the first and second microphones.

According to an embodiment, the controller may detect a noise signal input to the first microphone during the phone call, and automatically select either one of the first and second microphones based on the detected noise signal.

According to an embodiment, the controller may detect a noise signal input to the first microphone during the phone call, and automatically select the second microphone when a magnitude of the noise signal is above a threshold value, and automatically select the first microphone when the magnitude of the noise signal is less than the threshold value.

According to an embodiment, the controller may recognize a counterpart voice during the phone call, and when a keyword associated with a magnitude of the voice signal is detected from the recognized voice, the controller may automatically select either one of the first and second microphones based on the detected keyword.

According to an embodiment, the controller may recognize a counterpart voice during the phone call, and automatically select the first microphone when a first keyword associated with the magnitude of the voice signal is detected from the recognized voice, and automatically select the second microphone when a second keyword associated with the magnitude of the voice signal is detected, wherein the first and second keywords are different from each other.

According to an embodiment, the controller may detect a magnitude of the voice signal input through either one of the first and second microphones in real time during the phone call, and automatically select the second microphone when the detected magnitude of the voice signal is less than a threshold value, and automatically select the first microphone when the detected magnitude of the voice signal is above the threshold value.

According to an embodiment, when either one of the first and second microphones is selected, the controller may generate notification information indicating that the either one is selected, and output the generated notification information to an earphone of the headset during the phone call.

According to an embodiment, when either one of the first and second microphones is selected, the controller may automatically turn on a display unit of the external device, and control the external device to display a call sound quality setting icon for setting a call sound quality on the display unit.

According to an embodiment, when the call sound quality setting icon is selected, the controller may control the external device to display call sound quality items for providing different call sound qualities at positions adjacent to the call sound quality setting icon.

The call sound quality items may include a first call sound quality item for amplifying a gain of the voice signal by a preset first gain as a frequency of the voice signal increases, a second call sound quality item for amplifying a gain of the voice signal by a preset second gain as the frequency of the voice signal increases, and a third call sound quality item for decreasing a gain of the voice signal by a preset third gain as the frequency of the voice signal increases, and the preset first through third gains are different from each other.

According to an embodiment, the controller may recognize the counterpart voice during the phone call, and automatically turn on a display unit of the external device when a keyword associated with the magnitude of the voice signal is detected from the recognized voice, and control the external device to display a call sound quality setting icon for setting a call sound quality for the phone call.

According to an embodiment, the controller may detect a magnitude of voice signal input through either one of the first and second microphones during the phone call, and automatically turn on the display unit of the external device based on the detected magnitude of the voice signal, and control the external device to display a call sound quality setting icon for setting a call sound quality for the phone call.

According to an embodiment, the controller may control the external device to display a call sound quality setting icon for setting a call sound quality on the external device when either one of the first and second microphones is selected or a user input is received.

According to an embodiment, the controller may automatically turn on the display unit of the external device when either one of the first and second microphones is selected or a user input is received, and control the external device to display a phone call screen and a call sound quality setting icon for setting a call sound quality during the phone call on the display unit.

According to an embodiment, the controller may control the external device to display a plurality of voice quality items on the display unit when the call sound quality setting icon is selected.

According to an embodiment, when any one of the plurality of call sound quality items is selected, the controller may control the external device to display call sound quality information corresponding to the selected any one item on the display unit.

According to an embodiment, the call sound quality information may include a call sound quality graph indicating a gain value according to a frequency of the voice signal, an original sound playback icon for playing back a voice signal input through the selected any one microphone, and an output voice playback icon for playing back a voice signal output according to the call sound quality graph.

According to an embodiment, when a user setting icon for changing a gain value of the call sound quality graph is selected, the controller may change a gain value of the call sound quality graph according to a drag input, and reflect the changed gain value on the call sound quality graph.

According to an embodiment, when the user setting icon is selected, the controller may activate a plurality of points indicating a gain value of the call sound quality graph, and when any one of the plurality of points is moved, the controller may change a gain value at the any one point to a gain value corresponding to the moved point, and reflect the changed gain value on the call sound quality graph.

A headset according to embodiments of the present disclosure and a control method thereof may select a microphone during a phone call, correct a call sound received through the microphone, and transmit the corrected call sound to the counterpart terminal, thereby improving a quality of user call sound transmitted to the counterpart terminal.

A headset according to embodiments of the present disclosure and a control method thereof may select a microphone during a phone call, correct a call sound received through the microphone, and transmit the corrected call sound to the counterpart terminal, thereby improving a quality of user call sound transmitted to the counterpart terminal, and a control method thereof.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, preferred embodiments of the present disclosure will be described in detail with reference to the accompanying drawings, and the same or similar elements are designated with the same numeral references and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the invention pertains is judged to obscure the gist of the present disclosure. The accompanying drawings are used to help easily understand the technical idea of the present disclosure and it should be understood that the idea of the present disclosure is not limited by the accompanying drawings.

The mobile terminal described herein may be a mobile phone, a smart phone, a laptop computer, a digital broadcasting terminal, a personal digital assistant (PDA), a portable multimedia player (PMP), a telematics terminal mounted on a vehicle, a navigation apparatus mounted on a vehicle, a slate PC, a tablet PC, an ultrabook, a wearable device (for example, a smartwatch, smart glasses), an HMD (head mounted display), or the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
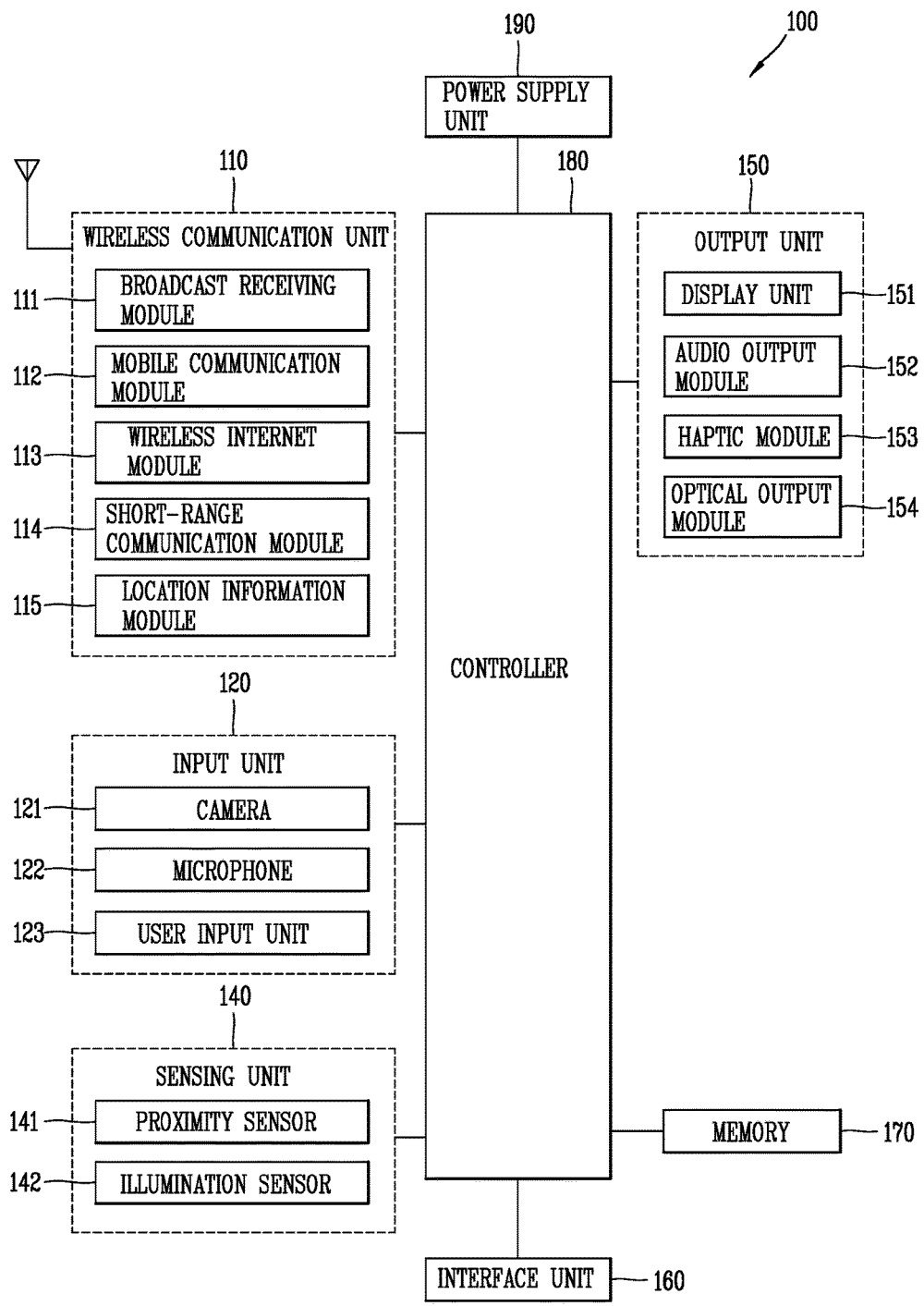
FIG. 1A is a block diagram for explaining a mobile terminal associated with the present disclosure.
Figure 1B:
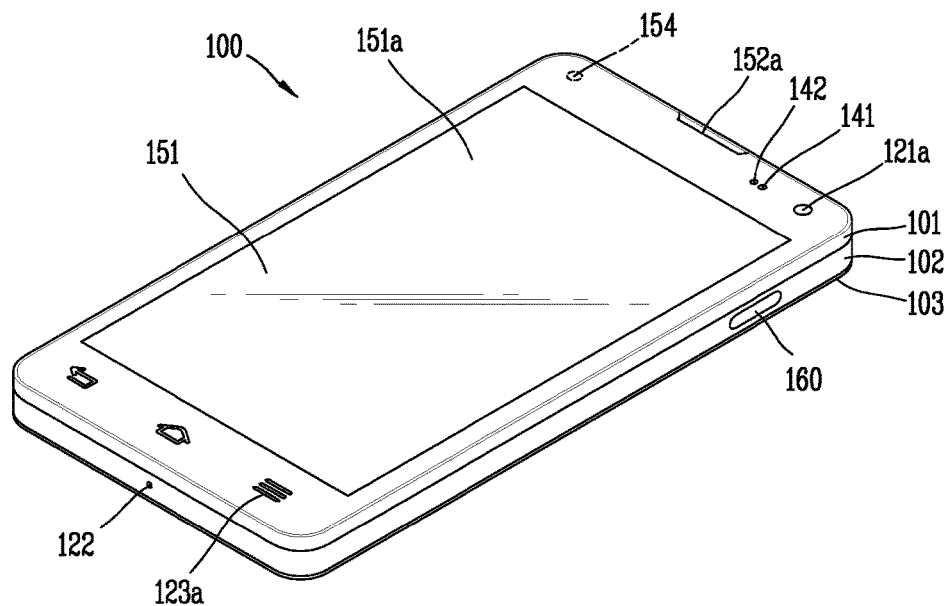
FIGS. 1B and 1C are conceptual views illustrating an example in which a mobile terminal associated with the present disclosure is seen from different directions.
Figure 1C:
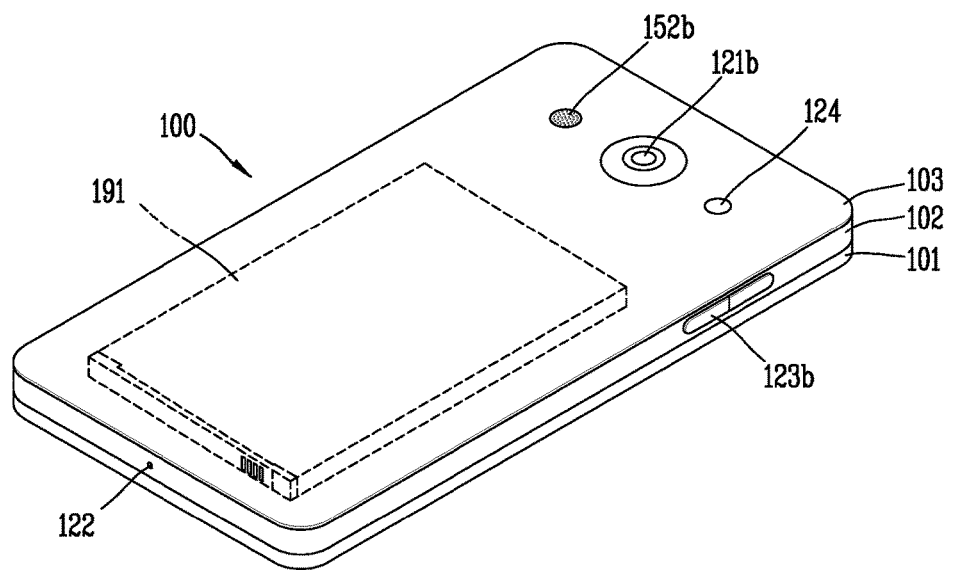

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. In addition, the wireless communication unit 110 may include one or more modules that connect the mobile terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, (G-sensor), gyroscope sensor, motion sensor, RGB sensor, infrared sensor (IR sensor: An infrared sensor, a finger scan sensor, an ultrasonic sensor, an optical sensor (for example, see camera 121), a microphone (see 122), a battery gauge), An environmental sensor (for example, a barometer, a hygrometer, a thermometer, a radiation sensor, a heat sensor, a gas sensor, etc.), a chemical sensor (e.g., an electronic nose, a healthcare sensor, One may be included. The mobile terminal 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output unit 152, a haptic module 153, an optical output unit 154 and the like. The display unit 151 may have an inter-layered structure or an integrated structure with a touch sensor in order to facilitate a touch screen. The touch screen may provide an output interface between the mobile terminal 100 and a user, as well as functioning as the user input unit 123 which provides an input interface between the mobile terminal 100 and the user.

The interface unit 160 serves as an interface with various types of external devices that can be coupled to the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

In addition, the memory 170 stores data that support various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the portable electronic device 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

The wireless signals may include audio call signal, video (telephony) call signal, or various formats of data according to transmission/reception of text/multimedia messages.

The wireless Internet module 113 refers to a module for supporting wireless Internet access, and may be built-in or externally installed on the mobile terminal 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range communication module 114 denotes a module for short-range communications.

Here, the another mobile terminal 100 may be a wearable device, for example, a smart watch, smart glasses or a head mounted display (HMD), which is able to exchange data with the mobile terminal 100 (or to like data with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 processes an image frame, such as still picture or video, obtained by an image sensor in a video phone call or image capturing mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a state that the pointer is positioned to be proximate onto the touch screen without contact will be referred to as 'proximity touch,' whereas a state that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, the touch object body may be a finger, a touch pen or stylus pen, a pointer, or the like as an object through which a touch is applied to the touch sensor.

As described above, when a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

On the other hand, in consideration of the input unit 120, the camera 121 may include at least one of a camera sensor (for example, CCD, CMOS, etc.) and a photo sensor (or image sensor) and a laser sensor.

Implementing the camera 121 with a laser sensor may allow detection of a touch of a physical object with respect to a 3D stereoscopic image. The camera 121 and the laser sensor may be combined to detect a touch of the sensing object with respect to a 3D stereoscopic image. More specifically, the photo sensor is integrated with photo diodes and transistors in the rows and columns thereof, and a content placed on the photo sensor may be scanned by using an electrical signal that is changed according to the amount of light applied to the photo diode. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. Also, the audio output unit 152 may also provide audible output signals associated with a particular function (e.g., a call signal reception sound, a message reception sound, etc.) carried out by the mobile terminal 100. The audio output module 152 may include a receiver, a speaker, a buzzer or the like.

A haptic module 153 may generate various tactile effects that the user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. Two or more haptic modules 153 may be provided according to the particular configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

On the other hand, the identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power inputted from the cradle may operate as signals for recognizing that the mobile terminal 100 has accurately been mounted to the cradle.

The memory 170 can store programs to support operations of the controller 180 and store input/output data (for example, phonebook, messages, still images, videos, etc.). The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a state of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the electronic device 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

For another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. The description in association with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (for example, a frame, a housing, a cover, etc.) constituting the appearance thereof. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, as illustrated in FIGS. 1B and 1C.

However, the foregoing configuration may not be necessarily limited to the arrangement. The foregoing configuration may be excluded, substituted or disposed on another surface if necessary. For example, the first manipulation unit 123a may not be disposed on the front surface of the terminal body, and the second audio output module 152b may be disposed on the side surface other than the rear surface of the terminal body.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

Furthermore, the display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

On the other hand, the touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

In this manner, the display unit 151 may form a flexible touch screen along with the touch sensor, and in this case, the touch screen may function as the user input unit 123 (refer to FIG. 1A). Therefore, the touch screen may replace at least some of the functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 may output light for indicating an event generation. Examples of the event generated in the electronic device 100 may include a message reception, a call signal reception, a missed call, an alarm, a schedule notice, an email reception, information reception through an application, and the like. When a user's event check is sensed, the controller 180 may control the optical output unit 154 to end the output of light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may employ any method if it is a tactile manner allowing the user to perform manipulation with a tactile feeling such as touch, push, scroll or the like. In addition, the first and second manipulation units 123a and 123b may also employ a method of allowing the user to perform manipulation without a tactile feeling through a proximity touch, a hovering touch, or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a fingerprint recognition sensor for recognizing a user's fingerprint, and the controller 180 may use fingerprint information sensed through the finger recognition sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an "array camera." When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Meanwhile, in recent years, as various functions are provided in the terminal, various information such as photographs, documents, and contacts are stored in the terminal. Accordingly, in order to protect such information, the mobile terminal according to the present disclosure may allow access to specific information, specific content, a specific function or a specific application is permitted only to a previously allowed user (or an pre-authorized user or a preset user). Meanwhile, in the present specification, "specific information, specific content, a specific function or a specific application for which security is set" is collectively referred to as "security set information."

On the other hand, "security set information" described in the present disclosure may be determined based on the user's selection. For example, any content (or information, function, application) for which security is not set, that is, general information, may be securely processed by the user's selection. Here, the term "being security processed" denotes that general information is converted into security set information that cannot be output without being subject to an authentication process for outputting on the terminal. The authentication process is a process that is essentially required to output security set information, and only when the authentication process is completed, that is, when authentication is successful, the security set information is output on the terminal. The authentication process may be performed through any one of various authentication methods, which will be described later.

Figure 2:
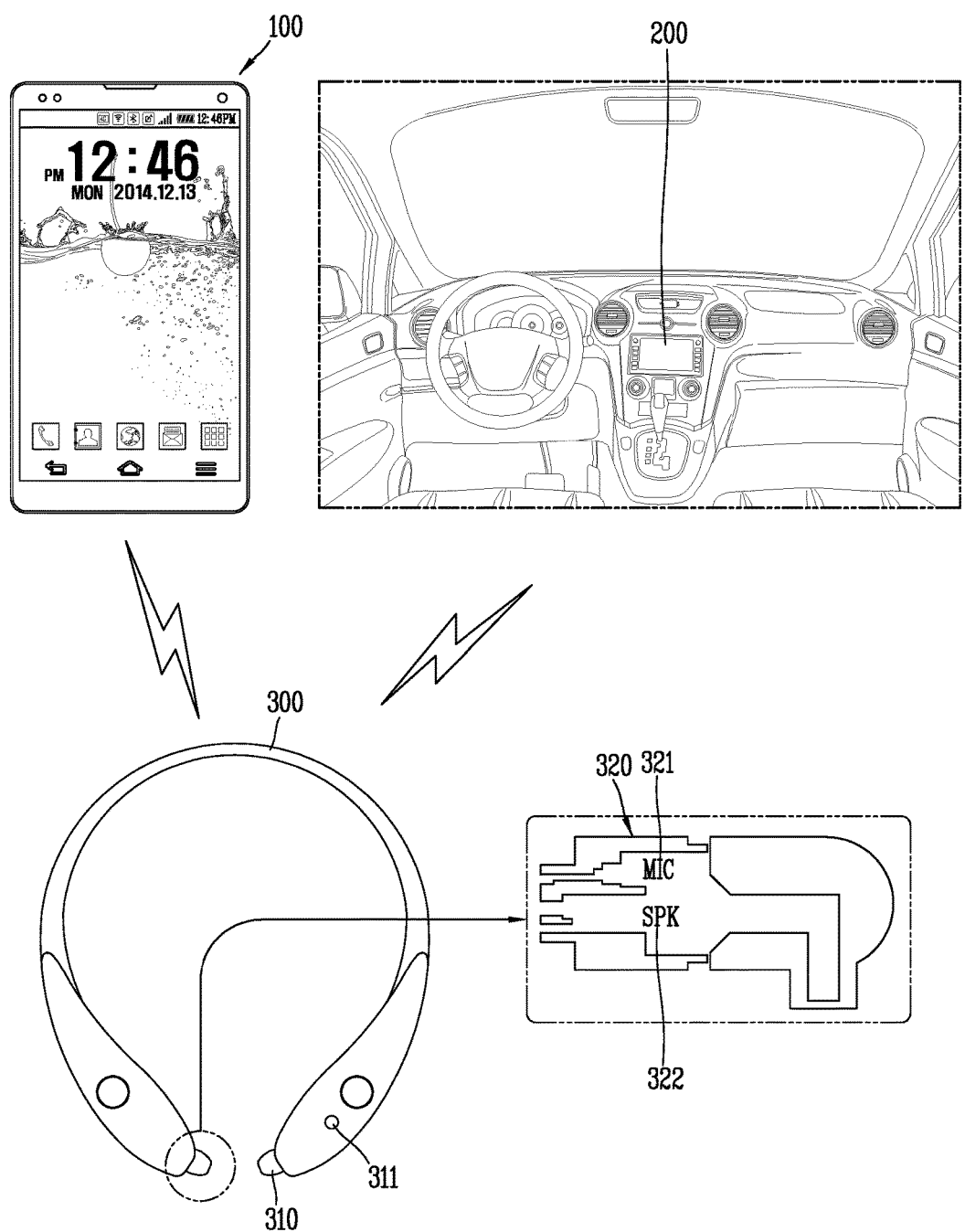
FIG. 2 is a schematic view illustrating a headset connected to a mobile terminal according to an embodiment of the present disclosure.

FIG. 2 is a schematic view illustrating a headset connected to a mobile terminal according to an embodiment of the present disclosure. As illustrated in FIG. 2, the headset 300 according to an embodiment of the present disclosure may be connected to a mobile phone, a smart phone, a laptop computer, a slate PC, a tablet PC, an ultrabook, a mobile terminal 100 such as a wearable device (e.g., a smartwatch, smart glasses, a head mounted display (HMD), or the like), or a terminal mounted on a vehicle (e.g., a head unit, a telematics terminal, a navigation device, a tablet PC, an ultrabook, or the like) 200 in a wired or wireless manner.

The headset 300 according to an embodiment of the present disclosure may include a first earphone (earphone receiver) 310, a first microphone 311 for receiving voice in the vicinity, and an earset (e.g., inner ear type earset) 320 configured with a second earphone (earphone receiver) 322 and a second microphone 321. The earset may be a combination of the second microphone 321 and the second earphone 322.

The headset 300 according to an embodiment of the present disclosure may include a pair of inner ear type earsets. The form of the headset 300 according to an embodiment of the present disclosure may be various forms such as a neckband headset, a headband headset, and the like. The headset 300 according to an embodiment of the present disclosure may include only one of the first microphone 311 and the second microphone 321.

Figure 3:
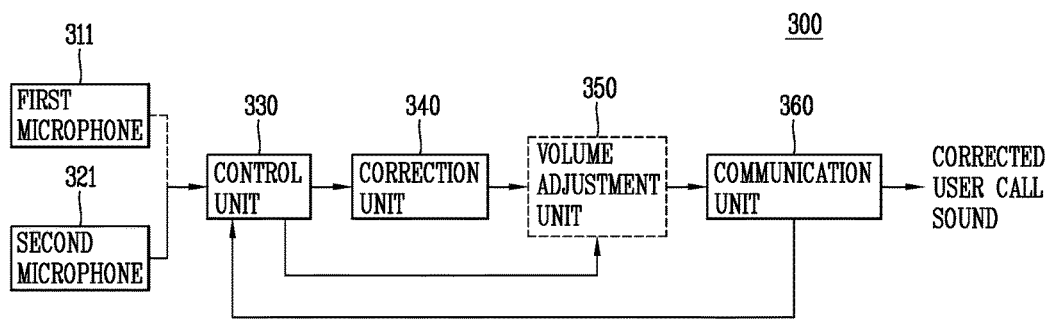
FIG. 3 is a block diagram illustrating the configuration of a headset according to an embodiment of the present disclosure.

FIG. 3 is a block diagram illustrating the configuration of a headset according to an embodiment of the present disclosure. As illustrated in FIG. 3, the headset 300 according to an embodiment of the present disclosure may include:

a first microphone 311 configured to receive a voice signal in the vicinity of the headset 300;

a second microphone 321 mounted within a user's ear to receive a voice signal provided from the user's external auditory canal;

a control unit 330 configured to select either one of the first and second microphones 311, 321 during a phone call;

a correction unit 340 configured to correct the voice signal received through the selected either one microphone; and a communication unit 360 configured to transmit the corrected voice signal to an external device (for example, reference numeral 100, 200).

Either one of the first microphone 311 or the second microphone 321 may receive a voice signal in the vicinity of the headset 300 or receive a voice signal provided from the user's external auditory canal.

Most noise signals (e.g., noise generated in a situation where the user rides a bicycle or motorcycle, vehicle noise, noise of nearby people, music sound, etc.) in the vicinity of the headset 300 may be blocked by an earset 320 mounted within the user's ear, and the second microphone 321 in the earset 320 may receive a voice signal provided from the user's external auditory canal without the ambient noise signals.

Figure 4:
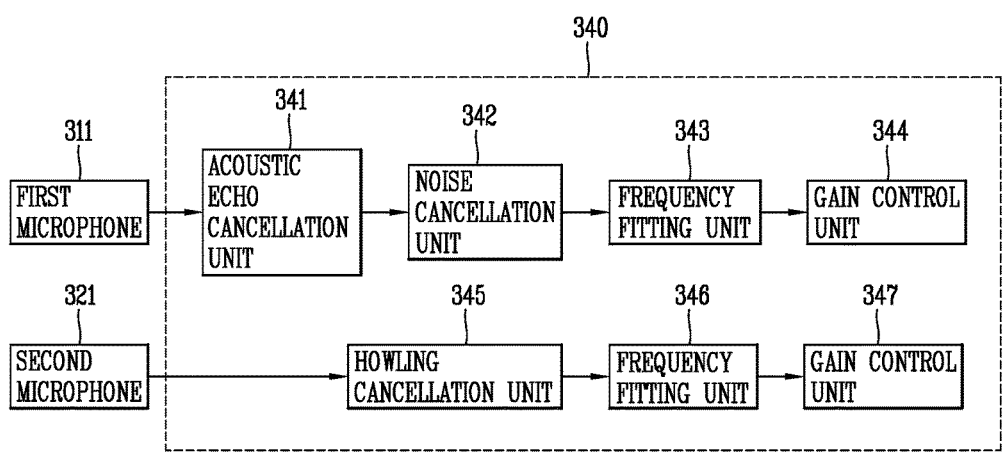
FIG. 4 is a block diagram illustrating a correction unit of a headset according to an embodiment of the present disclosure.

FIG. 4 is a block diagram illustrating a correction unit of a headset according to an embodiment of the present disclosure. The correction unit 340 may correct a voice signal received through the selected either one microphone, and output the corrected voice signal to the volume adjustment unit 350 or the communication unit 360.

The correction unit 340 may include an acoustic echo cancellation unit 341 configured to remove an acoustic echo generated by a voice signal received at the first microphone 311 when the first microphone 311 is selected by the control unit 330;

a noise cancellation unit 342 configured to remove noise of the voice signal from which the acoustic echo is removed;

a frequency fitting unit 343 configured to set a gain (loudness level) of the noise-removed voice signal to a different value according to a frequency (for example, a low frequency, a high frequency) of the noise-removed voice signal; and a gain control unit 344 configured to control the gain (loudness level) of the voice signal differently according to the gain (loudness level) of the voice signal output through the frequency fitting unit 343.

The correction unit 340 may further include a howling cancellation unit 345 configured to remove a howling generated by a voice signal received at the second microphone 321 when the second microphone 321 is selected by the control unit 330;

a frequency fitting unit 346 configured to set a gain (loudness level) of the voice signal to a different value according to a frequency (for example, a low frequency, a high frequency) of the howling-removed voice signal; and a gain control unit 347 configured to control the gain of the voice signal differently according to the gain of the voice signal output through the frequency fitting unit 346. The frequency fitting units 343, 346 may be configured with one frequency fitting portion, and the gain control units 344, 347 may also be configured with one gain control unit.

The frequency fitting unit 343, 346 may increase a gain of the voice signal as a frequency of the voice signal increases (high frequency), and reduce a gain of the voice signal as a frequency of the voice signal decreases (low frequency).

The gain control unit 344, 347 may adjust a gain of the voice signal according to the gain of the voice signal output through the frequency fitting units 343, 346, and amplify the voice signal by a preset gain when the gain of the voice signal is smaller than a reference value, and reduce the voice signal by a preset gain when the gain of the voice signal is larger than the reference value, thereby allowing the other party who hears the voice signal (sound) to hear at a preferable magnitude (loudness level).

Figure 5:
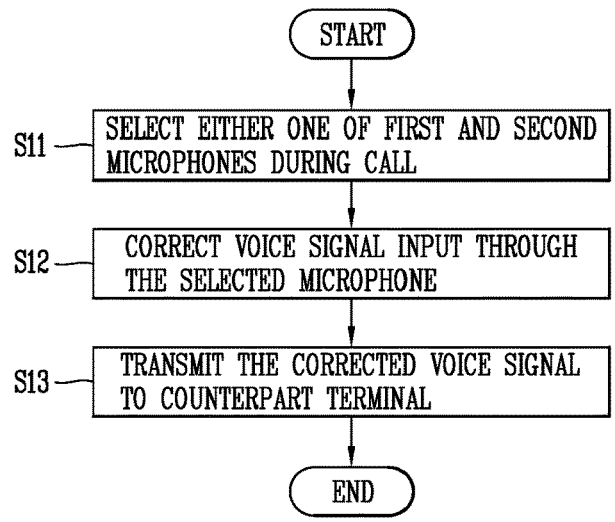
FIG. 5 is a block diagram illustrating a correction unit of a headset according to an embodiment of the present disclosure.

Hereinafter, the operation of the headset according to an embodiment of the present disclosure will be described with reference to FIG. 5. FIG. 5 is a flowchart illustrating an operation of a headset according to an embodiment of the present disclosure.

First, the control unit 330 selects either one of the first and second microphones 311, 321 according to a user input during a phone call (S11). When a button input, a touch input, or the like for selecting one of the first and second microphones 311 is received during a phone call, the control unit 330 selects either one of the first and second microphones 311, 311 based on the received button input, touch input, or the like. For example, when the user enters an input for using an inner ear type microphone (second microphone) 321 to make a phone call with a small sound during a lecture or during a meeting, the control unit 330 selects the inner ear type microphone (second microphone) 321. The button for selecting either one of the first and second microphones 311, 321 may be a toggle switch or a toggle button provided on a headset ear mold (or an ear bud).

When a user voice (user voice command) for selecting either one of the first and second microphones 311, 321 is recognized during a phone call, the control unit 330 may select either one of the first and second microphones 311, 321 based on the recognized user voice.

The control unit 330 may detect an ambient noise signal input to the first microphone 311 during a phone call, and automatically select either one of the first and second microphones 311, 321 based on the ambient noise signal. For example, the control unit 330 may detect an ambient noise signal input to the first microphone 311 in real time during a phone call, and automatically select the second microphone 321 when a magnitude of the ambient noise signal is above a threshold value (reference value), and automatically select the first microphone 311 when the magnitude of the ambient noise signal is less than a threshold (reference value).

The control unit 330 may recognize a counterpart voice during a phone call, and automatically select either one of the first and second microphones 311, 321 when a keyword (sentence, word, etc.) associated with a magnitude (loudness level) of the voice signal is detected from the recognized voice. For example, the control unit 330 recognizes a counterpart voice during a phone call, and automatically selects the first microphone 311 when a first keyword (for example, "I can hear you," etc.) associated with a magnitude (loudness level) of the voice signal is detected from the recognized voice, and automatically selects the second microphone 321 when a second keyword (for example, "I cannot hear you," etc.) associated with the magnitude of the voice signal is detected.

The control unit 330 may detect a magnitude of a user voice signal input through either one of the first and second microphones 311, 321 in real time during a phone call, and automatically detect the second microphone 321 when the detected magnitude of the voice signal is less than a threshold value (reference value), and automatically detect the first microphone 311 when the detected magnitude of the voice signal is above the threshold value (reference value)

When either one of the first and second microphones 311, 321 is selected, the control unit 330 may generate notification information (e.g., a voice guidance message, a "beep" sound, etc.) indicating that the either one microphone is selected, and output the generated notification information to at least one of the first earphone 310 and the second earphone 322 during the phone call.

The control unit 330 selects either one of the first and second microphones 311, 321, and outputs a voice signal input to the selected either one microphone to the correction unit 340.

The correction unit 340 corrects a sound quality of a voice signal input to the selected either one microphone, and outputs the corrected voice signal to the volume adjustment unit 350 or the communication unit 360 (S12). For example, when the first microphone 311 is selected by the control unit 330, the correction unit 340 corrects the sound quality of the voice signal received at the first microphone 311, and outputs the corrected voice signal to the volume adjustment unit 350 or the communication unit 360. When the second microphone 321 is selected by the control unit 330, the correction unit 340 corrects the sound quality of the voice signal received at the second microphone 321, and outputs the corrected voice signal to the volume adjustment unit 350 or the communication unit 360.

The volume adjustment unit 350 adjusts an output volume of the corrected voice signal according to a control signal of the control unit 330, and outputs the corrected voice signal to the communication unit 360 with the adjusted output volume.

The communication unit 360 transmits the corrected voice signal or the voice signal whose output volume is adjusted to the external device 100, 200. The communication unit 200 transmits the corrected voice signal or the voice signal whose output volume is adjusted to the counterpart external device (for example, reference numeral 100, 200) (S13).

Figure 6:
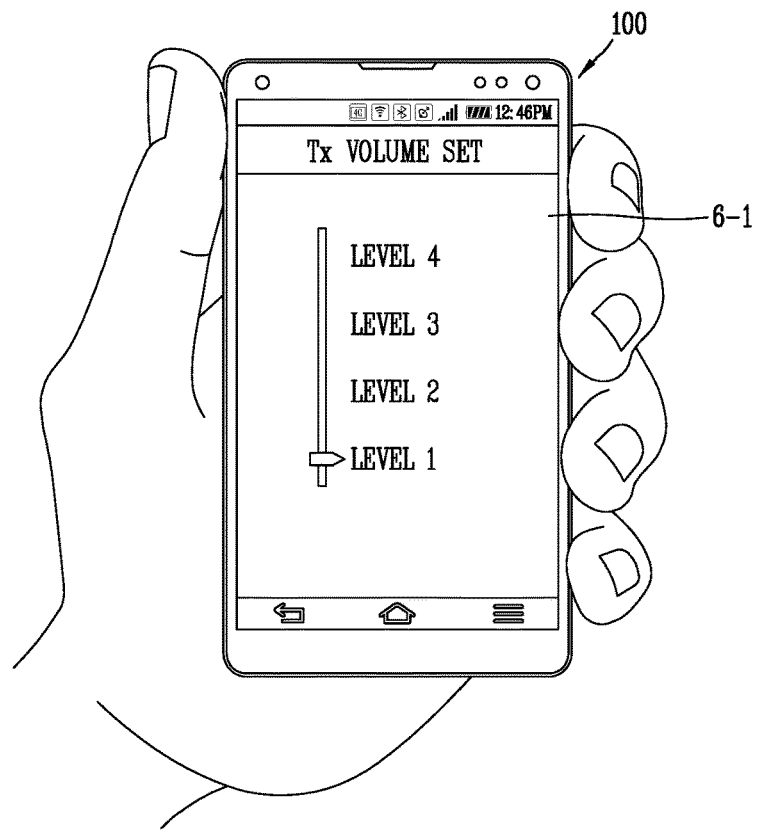
FIG. 6 is an illustrative view illustrating a control screen for controlling a volume adjustment unit according to an embodiment of the present disclosure.

Hereinafter, a method of controlling the volume adjustment unit 350 will be described with reference to FIG. 6. FIG. 6 is an illustrative view illustrating a control screen for controlling the volume adjustment unit 350 according to an embodiment of the present disclosure.

When either one of the first and second microphones 311, 321 is selected during a phone call, the control unit 330 transmits a control screen for adjusting an output volume of the corrected voice signal to the external device 100, 200 through the communication unit 360. When the control screen 6-1 is received from the control unit 330, the external device 100, 200 automatically turns on the display unit of the external device 100, 200, and displays the control screen 6-1 on the display unit.

The control screen 6-1 includes a plurality of voice volume levels so that the user's voice can be delivered to the counterpart with the user's desired volume. For example, the control screen 6-1 may include a volume level 1 (Level 1) for maintaining the volume of the corrected voice signal as it is, a volume level 2 (Level 2) for increasing or decreasing the volume level of the corrected voice signal by 50%, a volume level 3 (Level 3) for increasing or decreasing the volume level of the corrected voice signal by 70%, and a volume level 4 (Level 4) for increasing or decreasing the volume level of the corrected voice signal by 100%, and the like.

Figure 7A:
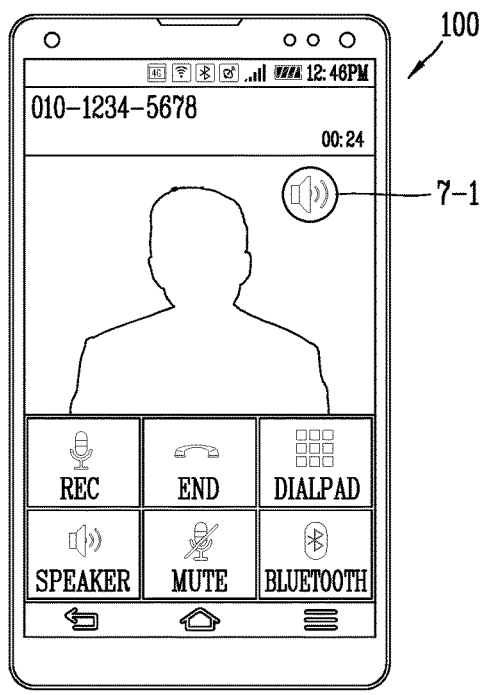
FIGS. 7A and 7B are illustrative views illustrating a method of setting a call sound quality during a phone call according to an embodiment of the present disclosure.
Figure 7B:
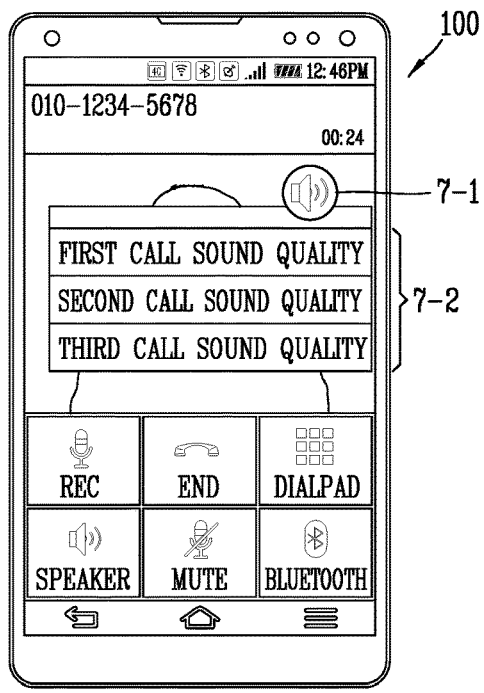

Hereinafter, a method of setting a call sound quality during a phone call will be described with reference to FIGS. 7A and 7B. FIGS. 7A and 7B are illustrative views illustrating a method of setting a call sound quality during a phone call according to an embodiment of the present disclosure.

As illustrated in FIG. 7A, when either one of the first and second microphones 311, 321 is selected during a phone call, the control unit 330 controls the external device 100, 200 to display a call sound quality setting icon (menu, pop-up window, etc.) 7-1 for setting a call sound quality on the external devices 100, 200. For example, the external device 100, 200 automatically turns on the display unit of the external device 100, 200 according to a control signal of the control unit 330 during a phone call, and displays a phone call screen and the call sound quality setting icon (menu, pop-up window, etc.) 7-1 on the display unit. An application corresponding to the call sound quality setting icon 7-1 may be a floating application, and displays the call sound quality setting icon (menu, pop-up window, etc.) 7-1 on the phone call screen as an application independent of a phone call application. An application corresponding to the call sound quality setting icon 7-1 may be installed in the headset 300 or the external devices 100, 200.

As illustrated in FIG. 7B, when the call sound quality setting icon 7-1 is selected (touched), the control unit 330 displays a plurality of call sound quality items 7-2 at positions adjacent to the call sound quality setting icons 7-1.

The plurality of voice quality items 7-2 may include a first call sound quality item for amplifying a magnitude (gain) of the voice signal to a preset first magnitude as a frequency of the voice signal increases (for example, 125 Hz to 8000 Hz), a second call sound quality item for amplifying the magnitude (gain) of the voice signal to a second magnitude (gain) that is larger than the preset first magnitude (gain) as the frequency of the voice signal increases (for example, 125 Hz to 8000 Hz), and a third call sound quality item for reducing the magnitude (gain) of the voice signal to a preset third magnitude (gain) as the frequency of the voice signal increases (for example, 125 Hz to 8000 Hz).

For example, when the first call sound quality item is selected, the control unit 330 may set a gain value to 20 dBHL (dB Hearing Level) when the frequency of the voice signal has a 500 Hz bandwidth, and set the gain value to 25 dBHL (dB Hearing Level) when the frequency of the voice signal has a 1000 Hz bandwidth, and set the gain value to 28 dBHL (dB Hearing Level) when the frequency of the voice signal has a 2000 Hz bandwidth, and set the gain value to 30 dBHL (dB Hearing Level) when the frequency of the voice signal has a 4000 Hz bandwidth, and they may vary according to the designer or the user's operation.

When the first call sound quality item is selected, the control unit 330 may set a gain value to 20 dBHL (dB Hearing Level) when the frequency of the voice signal has a 500 Hz bandwidth, and set the gain value to 30 dBHL (dB Hearing Level) when the frequency of the voice signal has a 1000 Hz bandwidth, and set the gain value to 35 dBHL (dB Hearing Level) when the frequency of the voice signal has a 2000 Hz bandwidth, and set the gain value to 40 dBHL (dB Hearing Level) when the frequency of the voice signal has a 4000 Hz bandwidth, and they may vary according to the designer or the user's operation.

When the first call sound quality item is selected, the control unit 330 may set a gain value to 45 dBHL (dB Hearing Level) when the frequency of the voice signal has a 500 Hz bandwidth, and set the gain value to 30 dBHL (dB Hearing Level) when the frequency of the voice signal has a 1000 Hz bandwidth, and set the gain value to 20 dBHL (dB Hearing Level) when the frequency of the voice signal has a 2000 Hz bandwidth, and set the gain value to 10 dBHL (dB Hearing Level) when the frequency of the voice signal has a 4000 Hz bandwidth, and they may vary according to the designer or the user's operation.

The frequency fitting unit 343, 346 adjusts a magnitude (gain) of the voice signal according to any one of the first to third call sound quality items under the control of the control unit 330. When a user voice (user voice command) for selecting either one of the first and second microphones 311, 321 is recognized during a phone call, the control unit 330 may control the external device 100, 200 to display the call sound quality setting icon 7-1 on the external device 100, 200 based on the recognized user voice.

The control unit 330 may detect an ambient noise signal input to the first microphone 311 during a phone call, and control the external device 100, 200 to display the call sound quality setting icon 7-1 on the external device 100, 200 based on the ambient noise signal. For example, the control unit 330 may detect an ambient noise signal input to the first microphone 311 during a phone call, and control the external device 100, 200 to display the call sound quality setting icon 7-1 on the external device 100, 200 when a magnitude of the ambient noise signal is above a threshold value (reference value).

The control unit 330 may recognize a counterpart voice during a phone call, and control the external device 100, 200 to display the call sound quality setting icon 7-1 on the external device 100, 200 when a keyword (sentence, word, etc.) associated with a magnitude of the voice signal is detected from the recognized voice. For example, the control unit 330 may recognize a counterpart voice during a phone call, and control the external device 100, 200 to display the call sound quality setting icon 7-1 on the external device 100, 200 when a keyword ("I cannot hear you," etc.) associated with a magnitude of the voice signal is detected from the recognized voice.

The control unit 330 may detect a magnitude of a user voice signal input through either one of the first and second microphones 311, 321 in real time during a phone call, and control the external device 100, 200 to display the call sound quality setting icon 7-1 on the external device 100, 200 based on the detected magnitude of the voice signal. The control unit 330 may detect a magnitude of a user voice signal input through either one of the first and second microphones 311, 321 in real time during a phone call, and control the external device 100, 200 to display the call sound quality setting icon 7-1 on the external device 100, 200 when the detected magnitude of the voice signal is less than a threshold value.

Figure 8A:
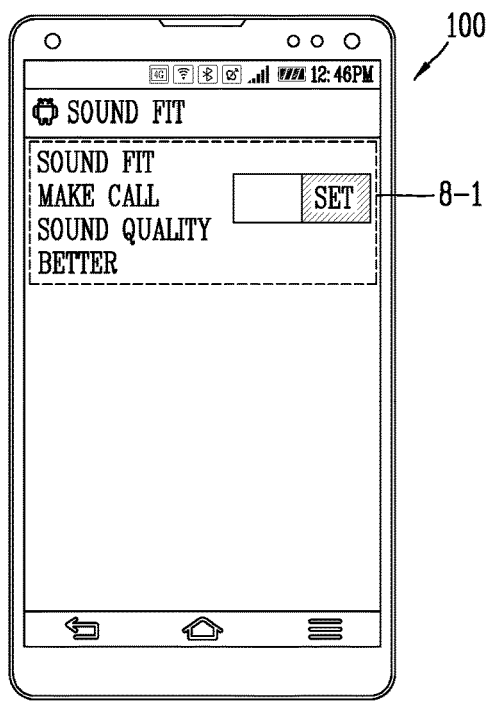
FIGS. 8A through 8E are illustrative views illustrating another method of setting a quality of call sound during a phone call according to an embodiment of the present disclosure.
Figure 8B:
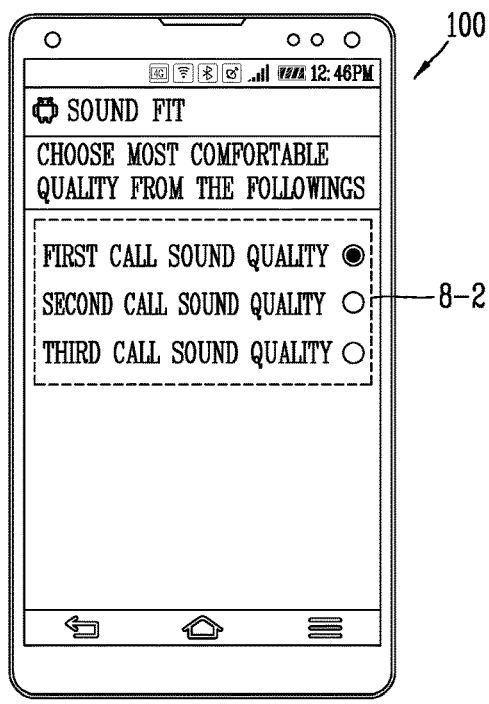

Hereinafter, another method of setting a call sound quality during a phone call will be described with reference to FIGS. 8A and 8B. FIGS. 8A through 8E are illustrative views illustrating another method of setting a call sound quality during a phone call according to an embodiment of the present disclosure.

As illustrated in FIG. 8A, when the call sound quality setting icon 7-1 is selected (touched) or a user input is received during a phone call, the control unit 330 controls the external device 100 to display a setting window 8-1 for setting or releasing a call sound quality on the external device 100. Alternatively, when the call sound quality setting icon 7-1 is selected (touched) or a user input is received during a phone call, the external device 100 displays a setting window 8-1 for setting or releasing a call sound quality on the display unit.

For example, the external device 100 automatically turns on the display unit of the external device 100 according to a control signal of the control unit 330 during a phone call, and displays the call sound quality setting icon 8-1 on the display unit. The control unit 330 controls the external device 100 to display a plurality of call sound quality items 8-2 on the external device 100 when the call sound quality setting window 8-1 is changed from a released state to a set state.

As illustrated in FIG. 8B, the external device 100 displays a plurality of call sound quality items 8-2 under the control of the control unit 330. The user may select any one of the plurality of call sound quality items 8-2. The plurality of call sound quality items 8-2 may include a first call sound quality item for amplifying a magnitude (gain) of the voice signal by a preset first magnitude as a frequency of the voice signal increases (for example, 125 Hz to 8000 Hz), a second call sound quality item for amplifying the magnitude (gain) of the voice signal by a preset second magnitude as the frequency of the voice signal increases (for example, 125 Hz to 8000 Hz), and a third call sound quality item for reducing the magnitude (gain) of the voice signal by a preset third magnitude as the frequency of the voice signal increases (for example, 125 Hz to 8000 Hz), and the like. Therefore, the user may immediately set his or her voice to a preset gain such as "clearly," "loudly," or "softly," and it may be transmitted to the counterpart terminal.

Figure 8C:
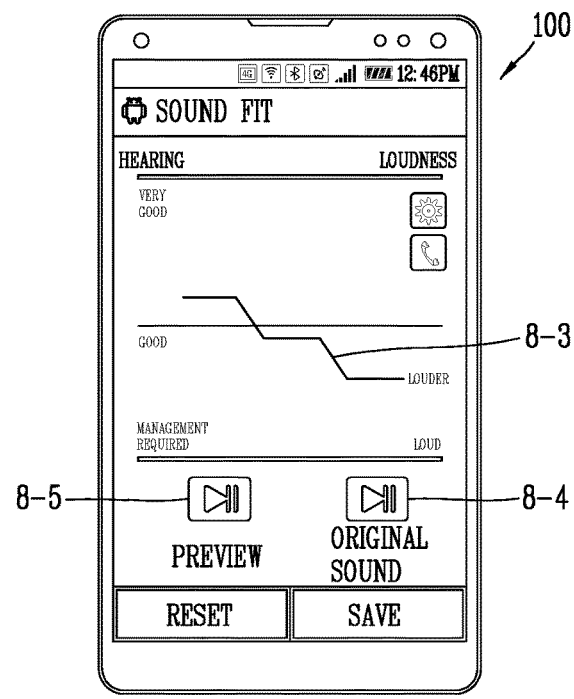

As illustrated in FIG. 8C, when any one of the plurality of call sound quality items 8-2 is selected, the external device 100 displays call sound quality information corresponding to the selected call sound quality item on the display unit. The call sound quality information may include a call sound quality graph 8-3 indicating a gain value according to a frequency of the voice signal, an original sound playback icon 8-4 for playing back an original voice signal, and an output voice playback icon 8-5 for playing back the voice signal output according to the call sound quality graph 8-3.

For example, the external device 100 may set a gain value to 20 dBHL (dB Hearing Level) when the frequency of the voice signal has a 500 Hz bandwidth, and set the gain value to 25 dBHL (dB Hearing Level) when the frequency of the voice signal has a 1000 Hz bandwidth, and set the gain value to 28 dBHL (dB Hearing Level) when the frequency of the voice signal has a 2000 Hz bandwidth, and set the gain value to 30 dBHL (dB Hearing Level) when the frequency of the voice signal has a 4000 Hz bandwidth, and they may vary according to the designer or the user's operation.

The external device 100 may set a gain value to 20 dBHL (dB Hearing Level) when the frequency of the voice signal has a 500 Hz bandwidth, and set the gain value to 30 dBHL (dB Hearing Level) when the frequency of the voice signal has a 1000 Hz bandwidth, and set the gain value to 35 dBHL (dB Hearing Level) when the frequency of the voice signal has a 2000 Hz bandwidth, and set the gain value to 40 dBHL (dB Hearing Level) when the frequency of the voice signal has a 4000 Hz bandwidth, and they may vary according to the designer or the user's operation.

The external device 100 may set a gain value to 45 dBHL (dB Hearing Level) when the frequency of the voice signal has a 500 Hz bandwidth, and set the gain value to 30 dBHL (dB Hearing Level) when the frequency of the voice signal has a 1000 Hz bandwidth, and set the gain value to 20 dBHL (dB Hearing Level) when the frequency of the voice signal has a 2000 Hz bandwidth, and set the gain value to 10 dBHL (dB Hearing Level) when the frequency of the voice signal has a 4000 Hz bandwidth, and they may vary according to the designer or the user's operation.

The left side of a horizontal axis of the call sound quality graph indicates a low frequency region, and the right side of the horizontal axis indicates a high frequency region. A vertical axis of the call sound quality graph indicates a gain value, and the gain value may increase (for example, 0 to 45 dBHL) from the top to the bottom of the vertical axis.

Figure 8D:
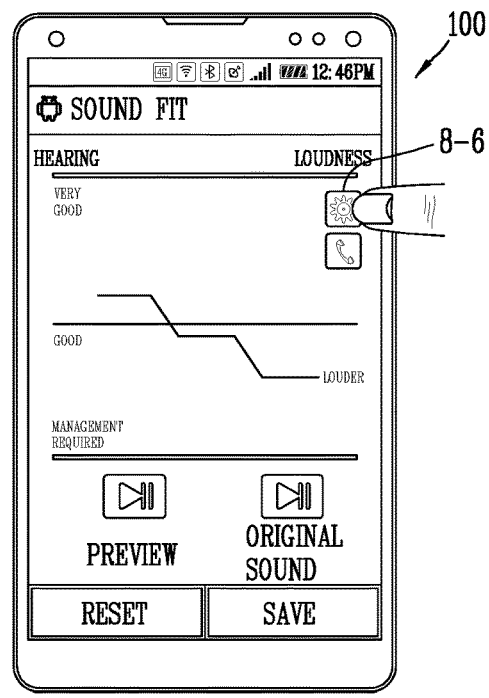
Figure 8E:
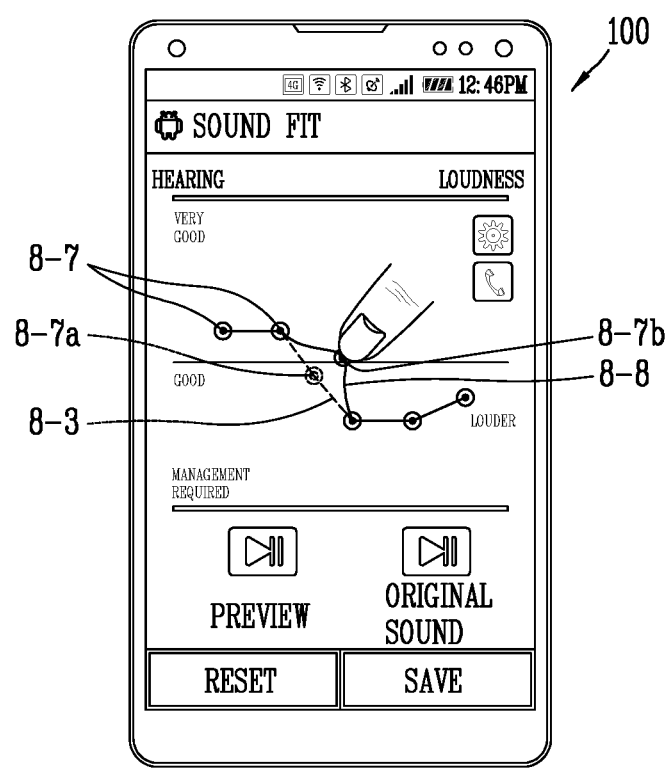

As illustrated in FIGS. 8D through 8E, when a user setting icon (menu) 8-6 for changing a gain value of the call sound quality graph 8-3 is selected (touched) under the control of the control unit 330, the external device 100 changes each gain value of the call sound quality graph 8-3 according to a user drag input, and reflects the changed gain value on the call quality graph 8-3, and stores a call sound quality graph 8-8 reflecting the changed gain value. For example, the external device 100 activates a plurality of points 8-7 indicating each gain value of the call sound quality graph 8-3 when a user setting icon (menu) 8-6 for changing the gain value of the call sound quality graph 8-3 is selected (touched) under the control of the control unit 330, and changes and stores the gain value of the any one point as a gain value corresponding to the moved point 8-7*b* when any one 8-7*a* of the plurality of points 8-7 is moved according to a user drag input.

When the output voice playback icon 8-5 is selected, the external device 100 plays back a voice signal output according to the call sound quality graph 8-8 reflecting the changed gain value.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

As described above, a headset according to embodiments of the present disclosure and a control method thereof may automatically select a microphone for a surrounding environment among a plurality of microphones when a user makes a call (phone call) through the headset, correct a user call sound received through the selected microphone, and transmit the corrected call sound to a counterpart terminal, thereby improving a quality of user call sound transmitted to the counterpart terminal.

What is claimed is:
1. A headset, comprising:
a wireless communication unit configured to provide wireless communication;
a first microphone mounted on the headset;
a second microphone to be placed within an ear of the user wearing the headset; and a controller configured to:
receive a phone call via the wireless communication unit from an external device,
select either one of the first microphone or the second microphone to receive a voice signal of the user responding to the received phone call,
in response to the selection of the first microphone, receive the voice signal of the user through the first microphone, correct a sound quality of the voice signal received through the first microphone, and transmit the corrected voice signal to the external device, and
in response to the selection of the second microphone, receive the voice signal of the user from the external auditory canal of the ear of the user having the second microphone placed therein, correct a sound quality of the voice signal received through the second microphone, and transmit the corrected voice signal to the external device,
wherein the controller is further configured to:
automatically turn on a display unit of the external device, and
control the external device to display a call sound quality setting icon for setting a call sound quality on the display unit of the external device.

2. The headset of claim 1, wherein the controller selects either one of the first and second microphones based on an input from the user.

3. The headset of claim 1, wherein the controller is further configured to:
automatically select either one of the first and second microphones based on a noise signal input to the first microphone during the phone call.

4. The headset of claim 3, wherein the controller is further configured to:
automatically select the second microphone when a magnitude of the noise signal is above a threshold value, and automatically select the first microphone when the magnitude of the noise signal is less than the threshold value.

5. The headset of claim 1, wherein the controller is further configured to:
select either one of the first and second microphones based on a keyword included in a voice signal from a counterpart user of the external terminal communicating during the phone call.

6. The headset of claim 5, wherein the controller is further configured to:
automatically select the first microphone when a first keyword is included in the voice signal from the counterpart user, and
automatically select the second microphone when a second keyword is included in the voice signal from the counterpart user, and
wherein the first and second keywords are different from each other.

7. The headset of claim 1, wherein the controller is further configured to:
detect a magnitude of the voice signal input through either one of the first and second microphones in real time during the phone call,
automatically select the second microphone when the detected magnitude of the voice signal is less than a threshold value, and
automatically select the first microphone when the detected magnitude of the voice signal is above the threshold value.

8. The headset of claim 1, wherein the controller is further configured to:
output notification information indicating which one of the first and second microphones is selected to an earphone of the headset during the phone call.

9. The headset of claim 1, wherein when the call sound quality setting icon is selected, the controller is further configured to:
control the external device to display call sound quality items for providing different call sound qualities at positions adjacent to the call sound quality setting icon.

10. The headset of claim 1, wherein the call sound quality items comprise:
a first call sound quality item for amplifying a gain of the voice signal by a preset first gain as a frequency of the voice signal increases;
a second call sound quality item for amplifying a gain of the voice signal by a preset second gain as the frequency of the voice signal increases; and
a third call sound quality item for decreasing a gain of the voice signal by a preset third gain as the frequency of the voice signal increases, and
wherein the preset first through third gains are different from each other.

11. The headset of claim 1, wherein the controller is further configured to:
automatically turn on a display unit of the external device when a specific keyword is included in a voice signal from a counterpart user of the external terminal communicating during the phone call, and
control the external device to display a call sound quality setting icon for setting a call sound quality for the phone call.

12. The headset of claim 1, wherein the controller is further configured to:
detect a magnitude of the voice signal input through either one of the first and second microphones during the phone call,
automatically turn on a display unit of the external device based on the detected magnitude of the voice signal, and
control the external device to display a call sound quality setting icon for setting a call sound quality for the phone call.

13. The headset of claim 1, wherein the controller is further configured to:
control the external device to display a call sound quality setting icon for setting a call sound quality on the external device when either one of the first and second microphones is selected or a user input is received.

14. The headset of claim 1, wherein the controller is further configured to:
automatically turn on a display unit of the external device when either one of the first and second microphones is selected or a user input is received, and
control the external device to display a phone call screen and a call sound quality setting icon for setting a call sound quality during the phone call on the display unit.

15. The headset of claim 14, wherein the controller is further configured to:
control the external device to display a plurality of voice quality items on the display unit when the call sound quality setting icon is selected.

16. The headset of claim 15, wherein the controller is further configured to:
when any one of the plurality of call sound quality items is selected, control the external device to display call sound quality information corresponding to the selected any one item on the display unit.

17. The headset of claim 16, wherein the call sound quality information comprises a call sound quality graph indicating a gain value according to a frequency of the voice signal, an original sound playback icon for playing back a voice signal input through the selected any one microphone, and an output voice playback icon for playing back a voice signal output according to the call sound quality graph.

18. The headset of claim 17, wherein the controller is further configured to:
when a user setting icon for changing the gain value of the call sound quality graph is selected, change the gain value of the call sound quality graph according to a drag input, and reflect the changed gain value on the call sound quality graph.

19. The headset of claim 18, wherein controller is further configured to:
when the user setting icon is selected, activate a plurality of points indicating the gain value of the call sound quality graph, and
when any one of the plurality of points is moved, change the gain value at the any one point to a changed gain value corresponding to the moved point, and reflect the changed gain value on the call sound quality graph.

* * * * *